Figure 1:
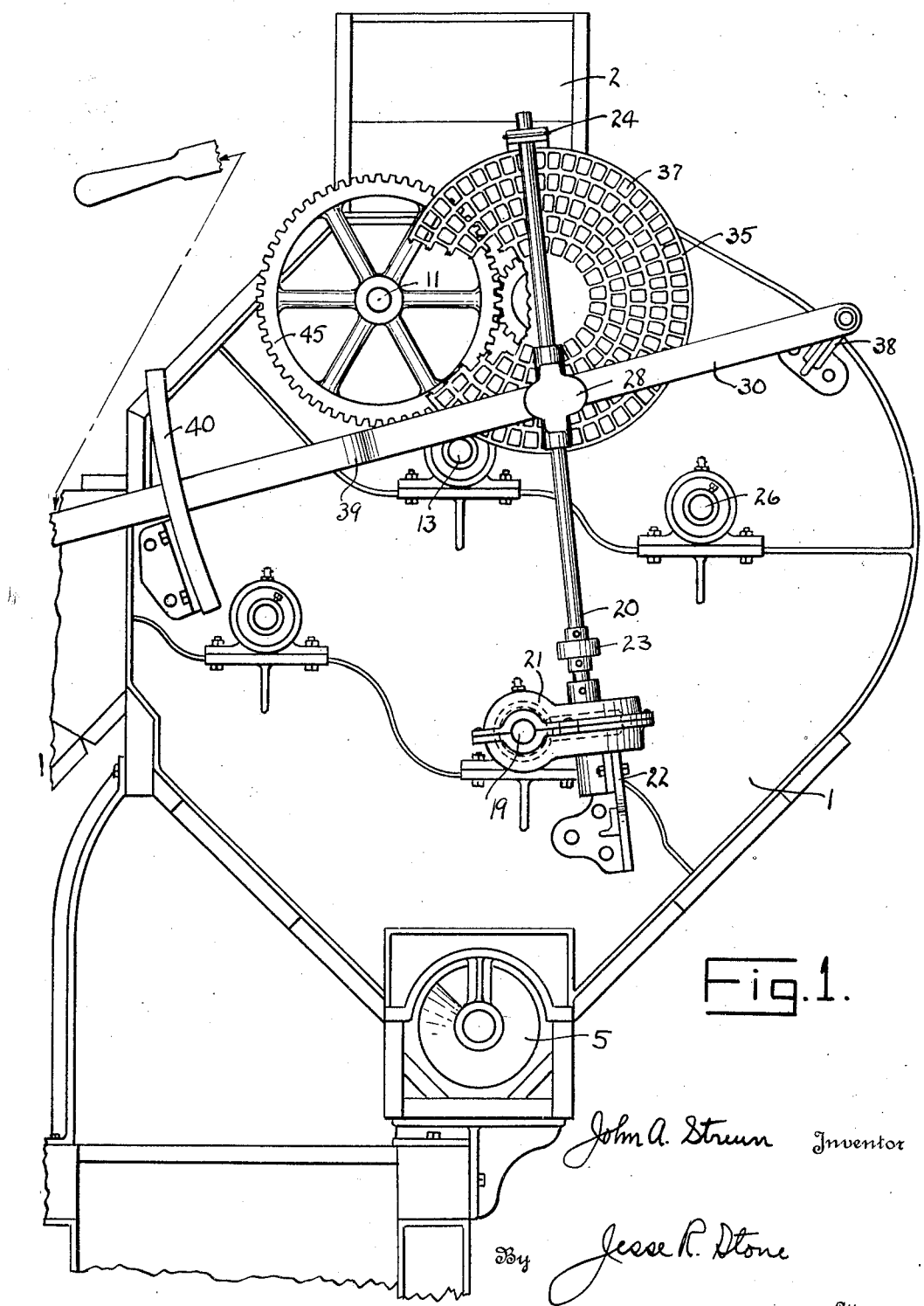

Sept. 10, 1929.  J. A. STREUN  1,727,734
VARIABLE SPEED OPERATING MECHANISM FOR COTTON CLEANERS
Filed March 10, 1928  2 Sheets-Sheet 2
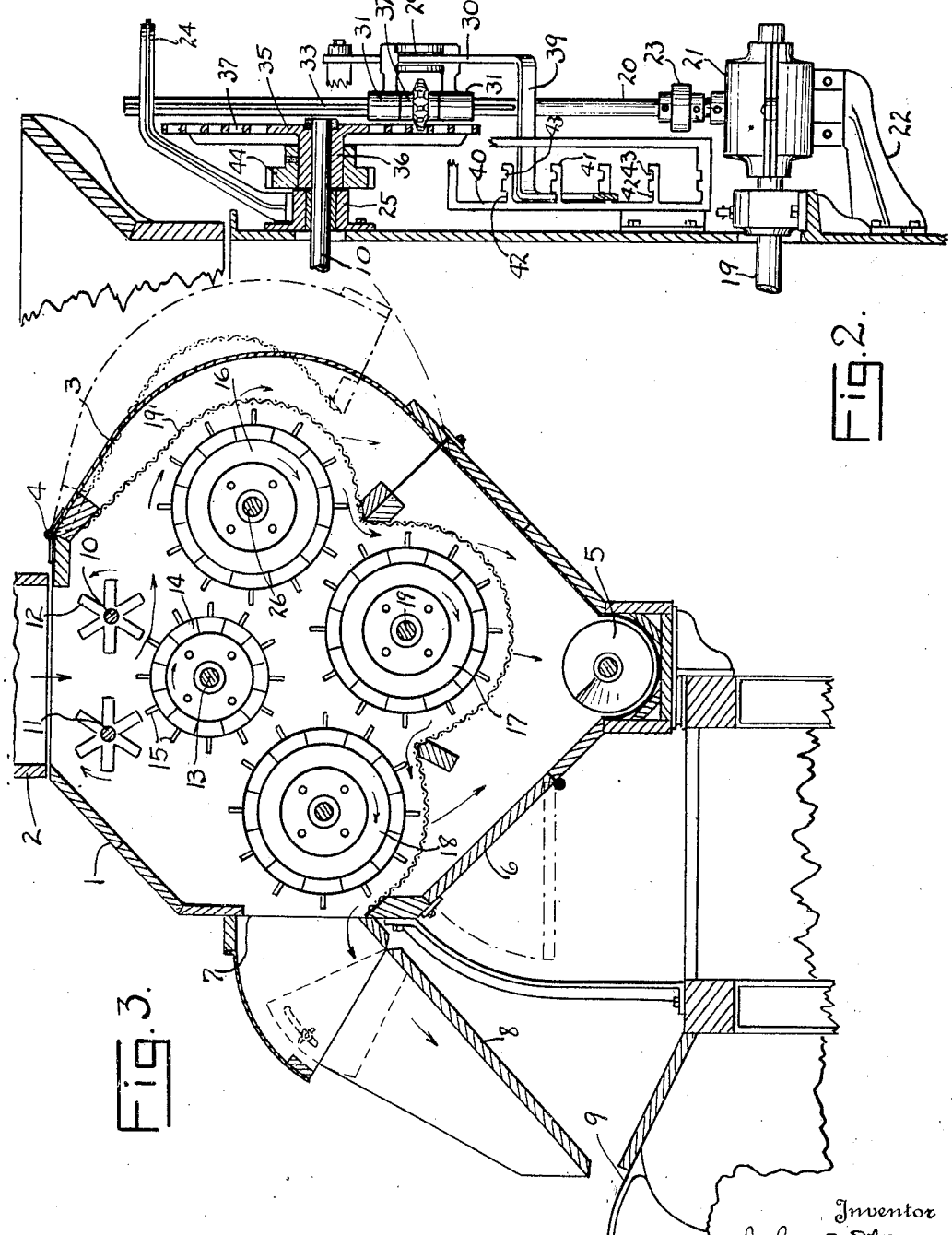

Patented Sept. 10, 1929.

1,727,734

UNITED STATES PATENT OFFICE.

JOHN ARNOLD STREUN, OF SHERMAN, TEXAS.

VARIABLE-SPEED OPERATING MECHANISM FOR COTTON CLEANERS.

Application filed March 10, 1928. Serial No. 260,701.

My invention relates to cleaning devices to be employed in separating chaff and foreign particles from seed cotton before it is fed to the cotton gin. It pertains more particularly to the means for obtaining a variable speed in the feed rollers connected with a device of this character. It is an object of the invention to provide a cotton cleaner and fluted feeding rollers connected therewith and means to operate said feed rollers at a variety of different speeds to accommodate the structure to cotton of different kinds.

It is desired that the cotton be fed to the device at a proper speed to care for the particular kind or condition of cotton which is being cleaned. The invention resides in a simple and economical mechanism whereby the speed of the feeding rollers may be varied within the desired limits, said mechanism being easily controlled by the operator.

Referring to the drawing herewith, Fig. 1 is a side elevation of a cotton cleaner showing my variable speed mechanism connected therewith, certain parts being broken away for greater clearness. Fig. 2 is a front view of said mechanism shown attached to the side of the cleaner, the wall of the cleaner and certain parts of the gearing being in vertical section. Fig. 3 is a side view of the cleaner with the side wall of the housing cut away close to the end of the cylinders.

The cleaner employed is disclosed particularly in Fig. 3. There is an outer housing indicated at 1, on the side walls of which are mounted bearings in which shafts are rotatable, said shafts carrying the various cylinders and rollers employed in the cleaning operation. The housing has an upper hopper 2 into which the cotton is fed. The rear wall of the housing, which is curved to conform to the shape of the cylinders, is provided with a door 3 hinged at 4 and adapted to be moved so as to disclose the interior of the housing so that access may be obtained to the operating cylinders. The lower end of the housing has therein a screw conveyor 5 for moving the trash and dirt from the housing. A second door in the housing is shown at 6. This door is in the forward inclined wall of the housing and gives access to that part of the interior of the housing. The delivery end of the cleaner on the forward side is provided with an opening 7 leading to a downwardly inclined chute 8, which delivers the cleaned cotton to the upper end of the gin 9.

Within the housing and directly below the hopper 2 is a pair of fluted feed rollers upon shafts 10 and 11, these rollers being adapted to rotate in opposite directions. They are spaced apart sufficiently to feed between them the desired amount of cotton to the cleaning cylinders below. These feed rollers are provided with radial flights or wings 12 which engage the cotton and move it downwardly.

Below the feeding rollers is mounted a shaft 13 having thereon a feeding cylinder 14 with radial teeth or prongs 15 thereon to engage the cotton and move it rearwardly in the housing. To the rear of the feed cylinder and slightly below the same is a picker cylinder 16, which is of the same construction as is the feeding cylinder 14 but of larger diameter and which is constructed to move at a lower speed than the feeding cylinder which is rotatable at a fairly high rate of speed.

The cotton passes from the cylinder 16 in a downward direction upon a second cleaning cylinder 17 which in turn advances the cotton beneath the third cleaning cylinder 18. The three cylinders 16, 17 and 18 are surrounded on their outer sides by a perforated screen 19' which may be of woven wire or perforated metal. It has openings therein to allow the passage of dirt and chaff from the cotton and it is to be understood that the cotton will be moved by the cleaning cylinders in a path around over the screen surface 19 so that by the time it is delivered to the chute 8 a large proportion of the impurities therein will be eliminated.

My invention resides particularly in the arrangement of the shafts 10 and 11 and the means whereby variable speed is imparted to the rollers thereon to feed the cotton at the desired rate to the cleaning cylinders. This mechanism is shown in Figs. 1 and 2. Upon the shaft 19 of the cleaning cylinder 17, I provide a worm gear which engages with a co-operating gear adjacent thereto and mounted upon a shaft 20. The gears thus connecting the shafts 19 and 20 are housed within a gear case 21 and need not be further described. The said gear case is mounted firmly upon a bracket 22 secured to the outer wall of the housing 1. There is a flexible coupling 23 in the shaft adjacent the gear case which allows a limited swinging movement to the upper end of said shaft 20. The shaft is extended upwardly at a slight angle from the vertical and is supported at its upper end within a bracket 24, which, as shown in Fig. 2, is formed on an arm extending downwardly at an incline and mounted upon a hub 25 supported upon the side wall of the housing to form a bearing for the shaft 10 of the roll feeder. The said bracket 24 has a swinging movement upon its support allowing a similar movement in the shaft 20.

Mounted upon the shaft 20 is a yoke or frame 28 which has on the outer side thereof a slot 29 therein to receive a lever arm 30. The yoke is formed with two arms extending toward the shaft and having bearings 31 thereon to fit slidably upon the shaft 20. These two bearings are spaced apart to receive between them upon said shaft 20, a pinion 32. The said pinion is mounted non-rotatably upon the shaft by means of a key or spline 33 which allows a longitudinal sliding movement of the pinion on the shaft.

Mounted rotatably upon the shaft 10 is a disc-shaped gear wheel 35. Said wheel has a hub 36 extending inwardly upon the shaft. The wheel itself comprises a disc having a series of concentric rows of openings 37 thereon, said openings being adapted to receive the teeth upon the pinion 32 and the engagement therewith of said teeth will cause the rotation of the gear wheel 35. These rows of openings are shown as five in number but it is understood that any desired number of rows within practical limits may be employed.

The pinion 32 may be adjusted to engage within any of these series of openings 37 by the movement of said pinion longitudinally upon the shaft 20. This movement is obtained through the lever 30 previously referred to. Said lever is pivoted at one end upon a bracket 38, mounted on the wall of the housing. It extends through the slot 29 in the yoke 28 and projects forwardly and is curved inwardly, as shown at 39 in Fig. 2, to engage within a bracket or rack 40 mounted upon the side of the housing. With reference to Fig. 2, it will be seen that the rack 40 has thereon a plurality of supporting arms 41, which are arranged in position to support the lever at a proper level to bring the drive pinion 32 into alignment with one of the rows of openings 37 in the gear disc. These supporting arms 41 have an inner notch 42 and an outer notch 43 therein and it will be obvious that when the lever is engaged within the inner notch, the pinion 32 will be brought into engagement with the gear 35, but when the lever is set into the outer notch 43 there will be no engagement between the two gears 32 and 35.

Mounted upon the hub 36 of the gear 35 is a spur gear 44. Said gear is fixed to the hub and rotatable therewith. It is mounted to engage with a second spur gear 45 mounted adjacent thereto upon the shaft of the feed roller 11. It will thus be seen that when the gear 35 is rotated through the drive pinion, rotation will be communicated to the feed roller 11, and it is to be understood that, as is common in cleaners of this kind, the shafts of the two rollers 10 and 11 are connected at the opposite end by inter-meshing gears so that the two rollers will rotate in opposite directions at the same speed. These gears are not shown as they are well known in the art.

In the operation of my device the operating parts will be rotated by the usual and ordinary mechanism, and rotation of the shaft 19 will cause the rotation of the shaft 20 as previously explained. The operating lever 30 will be manipulated to throw the drive pinion 32 into engagement with the proper row of openings in the gear 25 so as to obtain the proper speed, it being obvious that when the pinion is brought into engagement with the inner row of openings the speed of operation of the gear will be increased, but when the drive pinion 32 is moved away from the central row into any of the other rows the speed will be decreased proportionately to the distance of the drive pinion to the center of the disc. In this way the speed of rotation of the feed rollers 10 and 11 may be regulated in an obvious manner and this may be changed with very little manipulation of the operating lever. When it is desired to throw the control mechanism out of gear the lever 30 will be shifted from the inner notch 42 to the outer notch 43 of any of the arms 41 and no driving connection will be present. When the speed has once been fixed for the particular type of cotton being handled the lever arm will not have to be changed to other speeds, but in case of change in the quality or condition of the cotton, necessitating a greater or less speed of feeding of the cotton to the rotating cleaning members, the change may be accomplished easily and quickly.

The advantage of the construction lies in the fact that the operating mechanism is simple and easily controlled and can not readily get out of order and may be accessible for repair or replacement if such becomes necessary.

Having thus described my invention, what I claim as new and desire to protect by Letters Patent is:

1. In combination with a cotton cleaner, a speed changing device for the feeder rollers thereof, said device including a disc gear loosely mounted on one of the roller shafts, reduction gears driven by said disc gear, a speed changing pinion arranged to engage said disc gear, a control lever for said pinion, and a rack having an operative and inoperative position for said lever for each speed of said disc gear.

2. In combination with a cotton cleaner, a speed changing device for the feeder rollers thereof, said device including a disc gear on one of the roller shafts, a radially movable pinion to rotate said disc gear, a drive shaft for said pinion, a lever to move said pinion, and a yoke carrying said pinion slidable on both said shaft and said lever, whereby the speed of rotation of said disc gear may be varied.

3. In combination with a cotton cleaner, a speed changing device for the feeder rollers thereof, said device including a disc gear on one of the roller shafts, a radially movable pinion to rotate said disc gear, a drive shaft for said pinion, a lever to move said pinion, and a yoke carrying said pinion slidable on both said shaft and said lever, whereby the speed of rotation of said disc gear may be varied, said yoke having bearings on said shaft on opposite sides of said pinion.

4. In combination with a cotton cleaner, a speed changing device for the feeder rollers thereof, said device including a disc gear on one of the roller shafts, a radially movable pinion to rotate said disc gear, a drive shaft for said pinion, a lever to move said pinion, a yoke carrying said pinion slidable on both said shaft and said lever, whereby the speed of rotation of said disc gear may be varied, driving means for said shaft including worm gearing, a fluid tight housing therefor, and a universal connection in said shaft between said pinion and said housing.

In testimony whereof I hereunto affix my signature this 3 day of March, A. D. 1928.

JOHN ARNOLD STREUN.